United States Patent

[11] 3,612,838

[72] Inventor Don L. Conn
Middletown, Ohio
[21] Appl. No. 842,264
[22] Filed July 16, 1969
[45] Patented Oct. 12, 1971
[73] Assignee Armco Steel Corporation
Middletown, Ohio

[54] MEANS AND METHOD FOR THE CONTINUOUS NONDESTRUCTIVE TESTING OF METALLIC STRIP AND THE LIKE
25 Claims, 4 Drawing Figs.

[52] U.S. Cl. .................................................... 235/151.3,
73/104, 73/159
[51] Int. Cl. .................................................... G01b 19/32,
G01n 19/08
[50] Field of Search ........................................... 73/67.9,
67.8, 105, 104, 159; 235/151.35, 151.13, 151.3;
324/34 TA; 250/219 DF, 83.3 D

[56] References Cited
UNITED STATES PATENTS
3,278,747 10/1966 Ohmart ........................ 250/83.3 D
3,019,346 1/1962 Laycak ........................ 250/219 DF Primary Examiner—Eugene G. Botz
Attorney—Melville, Strasser, Foster & Hoffman ABSTRACT: Apparatus and procedures for accurately determining the quality of metallic strip or other essentially homogenous materials by multiplying direct current voltages which are the functions of (a) the magnitude of defect indications and (b) strip speed, accumulating the multiplied voltages, and dividing the accumulated voltages by a proportional figure representing the total length of material tested.

MEANS AND METHOD FOR THE CONTINUOUS NONDESTRUCTIVE TESTING OF METALLIC STRIP AND THE LIKE

BACKGROUND OF THE INVENTION

The present invention relates to the nondestructive testing of essentially homogenous materials to determine the presence and extent of defects in the material being tested, thereby enabling the producer to establish quality control standards and accurately grade the quality of a given run of material. While its utility is not so limited, the present invention will be described in connection with the inspection of steel strip as it is produced in a steel mill, such strip usually being rolled into continuous lengths of from two to three thousand feet. As will become evident, however, the apparatus and procedures herein described may be readily applied to the testing of diverse materials, as well as to materials other than a strip form, as for example, materials in the form of blocks, billets, or tubing.

Nondestructive testing procedures as such are well known and defects in a metallic strip, such as mechanical pipe or voids, inclusions, and segregations or differences in density have hitherto been detected by ultrasonic inspection wherein a beam of ultrasonic energy is directed into the material being tested and either its transmitted or reflected energy measured, inspection being accomplished because the ultrasonic beam will travel with little energy loss through essentially homogenous materials except when intercepted and reflected by discontinuities in the elastic continuum. Such defects also have been detected by electromagnetic induction, the material being tested being placed in the magnetic field of a coil or an array of conductors carrying an alternating current which induces eddy currents in the material, the magnitude of which will vary depending upon the presence of defects. A third known procedure for nondestructive testing involves thermal or infrared testing based on measuring the rate of flow of heat through the material, the rate varying depending upon the presence and extent of the internal defects encountered.

Experience has indicated that the performance of a given strip of material in the hands of the user can be predicted in accordance with the extent of the defects which are encountered; and a grading system has been developed in which a "quality number" is assigned to the material based on the inspection results. The quality number may be defined as a number indicative of the total defect areas of the strip divided by its total length. A defect area in the moving strip is usually measured by means of two parameters, defect depth, which is the depth of the defect compared to the thickness of the material, as determined by the amplitude of the signal received by the defect-detecting device, and defect length, as determined by the length of time the defect is displayed by the defect-detecting device. The defect area (or magnitude of defect) is thus the product of defect depth and defect length, and the sum total of the individual defect areas (magnitude of defects) divided by total strip length gives the quality number. While this approach has resulted in a workable system which has been used with some success, numerous difficulties are encountered in interpreting and evaluating the test results.

In a typical example of currently employed nondestructive testing procedures, the test results (the number and magnitude of defect indications) are recorded on a strip chart recorder and are thereafter visually evaluated, the operator manually calculating what he believes to be the total defective area. The length of the strip is also physically measured to determine its length, and the quality number calculated by dividing the manually computed defective material area by the total material length. Such procedure is subject to numerous errors and inaccuracies, and is also subject to considerable variations depending upon the interpretation of the strip chart recording by the operator. For example, variations in the speed of travel of the material, or stoppage of the material, can cause large errors in the recorded results in that the recorded defect length will vary with strip speed. If the strip speed is slowed by one-half, the recorded defect length will be doubled as compared to the recorded defect length of the same defect measured at original speed. Where defect indications are numerous, counting errors are almost assured, particularly when it is considered that a strip chart in a few feet of length will record defect indications for several thousand feet of strip. It is literally impossible to run the material at a constant speed due to speed-up as the strip is started in motion, and slowdown as it is stopped; and it is usually at the ends of the strip that defects are most commonly encountered. Operator judgment varies widely, as do individual evaluating techniques; consequently there may be as much as 5-10 percent variation between different operators' interpretation of a given strip chart. Such variations obviously result in marked differences in quality standards depending upon operator judgment and ability.

While it has hitherto been proposed to drive the strip chart recorder in synchronism with the speed of travel of the material, such efforts have been only partially successful and significant variations in results still occur. This is particularly true in endeavoring to accurately calculate the area of a given defect. An accurate quality number should be a function of magnitude of the defects detected as well as the mere number of defects.

RESUME OF THE INVENTION

A principal object of the present invention is the elimination of operator judgment in the nondestructive testing of continuously moving materials by providing a procedure and apparatus which accurately measures and computes both the number and area of defect indications independently of material speed variations and either automatically calculates a quality number directly or provides two readings from which the quality number can be readily calculated by the operator.

In accordance with the invention, two direct current voltages are generated, the first being a function of the magnitude of a defect indication, $d$, and the second a function of strip speed, $S$. These two voltages are multiplied to produce an output voltage which is the product of strip speed and defect magnitude $Sd$ per unit of time. The output voltage is accumulated and the total charge stored. At the end of the inspection run the accumulated voltage may be represented as:

(I) $\quad \Sigma_0^n S_1 d_1 + S_2 d_2 + \cdots S_n d_n$ which accurately represents the total defective area of the strip. At the same time, the total length or footage of the strip being inspected is measured and, in a preferred embodiment of the invention, a voltage generated which is proportional to the length of the strip. The quality number is then obtained by dividing the total defective area by the total length:

(II) $\quad \Sigma_0^n \dfrac{S_1 d_1 + S_2 d_2 + \cdots S_n d_n}{L} =$ Quality Number In accordance with the invention the division can be performed either manually or automatically. If manual, voltmeters or electronic counters will be provided to give visual readings of the accumulated voltages representing both total defective strip area and total strip length. Alternatively, the accumulated voltages can be fed to an electronic divider which will automatically perform the division, the readout of the divider representing the quality number of the material being tested.

While for practical purposes the quality number of equation II provides an accurate indication of strip performance, it is also within the spirit and purpose of the invention to additionally measure defect width, which may be defined as the lateral or crosswise extent of a defect, thereby giving a reading which is indicative of defect volume. Thus, three direct current voltages are generated, the first being a function of the magnitude of a defect indication showing the depth of the defect $d_z$, and the second a function of the magnitude of a defect indication showing the width of the defect $d_y$ relative to the total width of the material being tested. These two voltages are multiplied to produce a first output voltage which is the product of defect depth and defect width $d_x d_y$ and such output voltage is then multiplied by a third voltage which is the function of strip speed S, thereby producing a second output voltage which is the product of defect depth × defect width × defect length. The second output voltage is accumulated and the total charge stored, so that at the end of the inspection run the accumulated voltage may be represented as:

(III) $\Sigma_0^n S_1 d_{x1} d_{y1} + S_2 d_{x2} d_{y2} + \cdots S_n d_{xn} d_{yn}$ which accurately represent the total defective volume of the strip. At the same time, the total length of the strip is measured, and a voltage generated which is proportional to the total volume of the strip (V = total strip length × strip thickness × strip width). The quality number is then obtained by dividing the total defective volume by the total volume:

(IV) $\dfrac{\Sigma_0^n S_1 d_{x1} d_{y1} + S_2 d_{x2} d_{y2} + S_n d_{xn} d_{yn}}{V}$ As before, the division can be performed either manually or automatically. If desired, the quality number can be computed based on total strip length L rather than on volume V since for some applications an indication of defect volume relative to strip length will provide sufficiently accurate information for control purposes.

DESCRIPTION OF THE PREFERRED EMBODIMENTS

Figure 1:
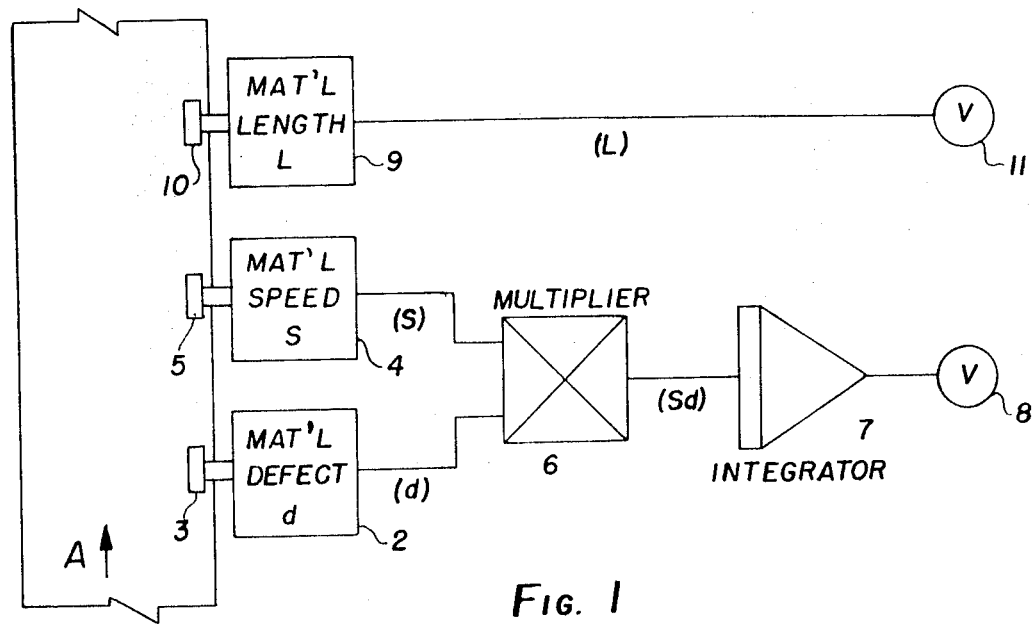
FIG. 1 is a schematic representation of a readout system in accordance with the invention in which the quality number is manually calculated.

With reference to the drawing, the strip material being inspected is indicated at 1, the strip moving in the direction of the arrow A. In accordance with the invention, a defect signal is obtained using any of the known nondestructive testing devices 2 which will generate a voltage $d$ proportional to the magnitude of the defect. This device may comprise an ultrasonic unit having a wheel 3 coupling it to the material being tested, or it may comprise a unit which induces eddy currents in the material being tested, or it may be a thermal testing unit which gauges the rate of flow of heat in the material. Such devices are all well known and each is capable of generating a readout voltage proportional to the defects encountered.

Material speed S is determined by a material speed transducer 4, which preferably comprises a tachometer generator driven by a wheel 5 which also contacts the strip, the tachometer generator producing an output voltage directly proportional to strip speed. Alternatively, an optical pickup pulse generator may be employed, the primary requisite of the speed transducer being the production of an output voltage which is a function of material speed.

The output voltages $d$ and S are fed to a multiplier 6 which comprises a device capable of producing an output voltage proportional to the product of the input signals $d$ and S. The multiplier 6 may comprise a Hall-Effect multiplier, or it may be an electronic multiplier, such as a multiplier module which utilizes one of the input signals to vary the transconductance of an input transistor stage which in turn amplifies the other input signal. A servomultiplier also may be employed in which multiplier potentiometers perform functional multiplication.

The output of the multiplier 6, which has been previously represented as:

(I) $\Sigma_0^n S_1 d_1 + S_2 D_2 + \cdots S_n d_n$ is fed to integrator 7 which accepts the output of the multiplier and stores the accumulated charge. The integrator may comprise a single input analog integrator which is utilized as a straight-forward voltage amplifier, or a digital integrator may be employed in which representative samplings of a varying function results in a series of analog voltages, which when converted to digital numbers through the use of an analog to digital converter, can be added to obtain a number representing the total area under the function, i.e., integration by summation. In the embodiment of FIGURE 1, the output of the integrator 7 is read on a digital voltmeter 8 which possesses the high input resistance and precision required to accurately measure the output voltage of the integrator without appreciable loading error.

Figure 2:
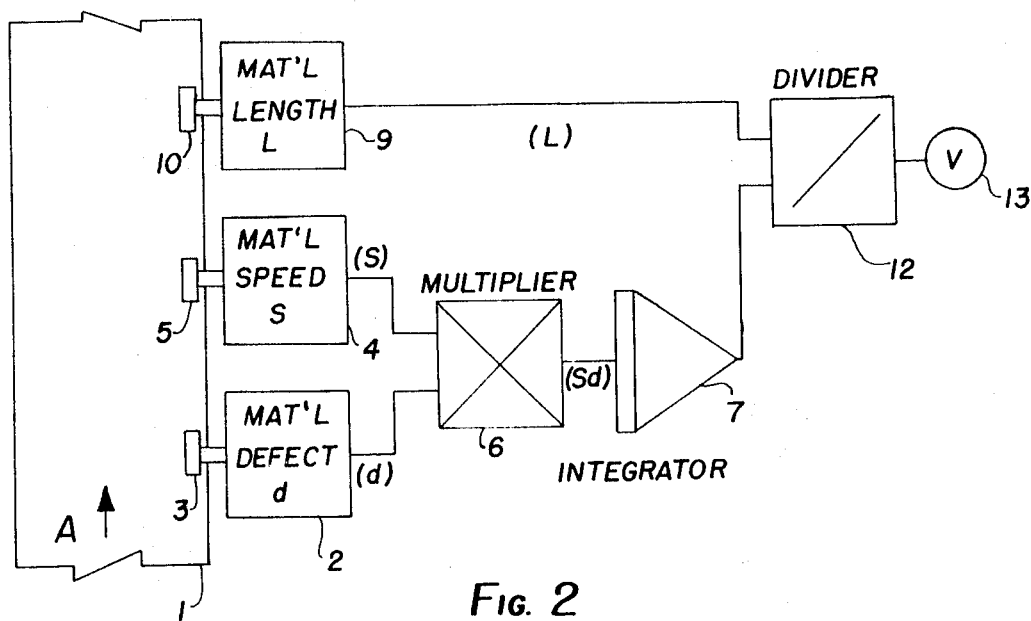
FIG. 2 is a similar schematic representation of a readout system in which the quality number is automatically computed.

It is also necessary in the systems of both FIGURES 1 and 2 to concurrently measure the total length or footage L of the material being tested. This may be conveniently done by means of a footage indicator 9 which also may have a wheel 10 contacting the strip 1, although as a practical matter the footage indicator may be operatively connected to and driven by the wheel 5 of the material speed transducer 4. The footage indicator preferably will be of the type which will produce a voltage proportional to strip length which can be read directly from a voltmeter 11 where the system of FIGURE 1 is employed. Alternatively, a mechanical counter can be employed to provide a direct numerical reading of strip length.

As should now be evident, the system of FIGURE 1 provides the operator with a readout at voltmeter 8 which accurately represents the total measured defective area irrespective of strip speed, and the readout at voltmeter (or counter) 10 represents the total measured length of strip tested. The operator may then readily compute the quality number applicable to the material being tested by dividing the total defective area by the total length:

(II) $\Sigma_0^n \dfrac{S_1 d_1 + S_2 d_2 + \cdots S_n d_n}{L} =$ Quality Number It will be understood that the quality number is, in effect, a measure of the percentage of the total length of the material which is defective, and as long as the readout of the meters 8 and 11 are in directly proportional units of comparable value, viz proportional voltages, the quality number will be a direct percentage reading. The values of the readout units may be arbitrarily chosen, with the quality number representing a figure on an arbitrarily chosen scale, as where a voltage readout is divided by strip length in feet. If desired, a scaler may be employed to divide large magnitude numbers for simplified computation.

Instead of manually calculating the quotient in formula (II) above, the system may, as illustrated in FIGURE 2, incorporate a divider 12 which embodies an electronic division circuit which will automatically compute the quality number by dividing the output voltage of the integrator 7 by the output of a voltage producing footage indicator 9, the divided voltage being read on a calibrated voltmeter 13. In this connection it may be noted that certain types of multipliers, such as electronic multipliers, will also divide when properly connected, and consequently it is to be understood that the division operation, in some instances, may be performed by operating components of the multiplier.

Figure 3:
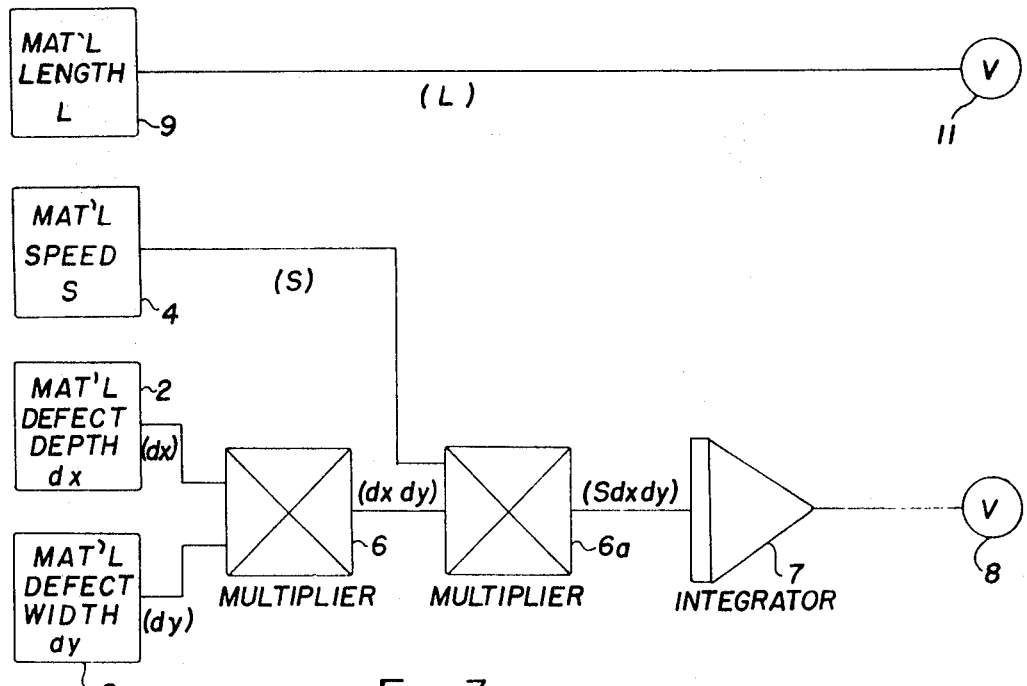
FIG. 3 is a schematic representation of a readout system for determining defect volume, the quality number being manually calculated.

In the embodiment of FIGURE 3 provision is made for the addition of a third parameter in determining the magnitude of the defects encountered, such additional parameter contemplating defect width $d_y$ which, when multiplied by defect depth $d_x$ and defect length S, provides an accurate indication of defect volume V. Generally speaking, the addition of such third parameter is only of importance in the testing of materials such as billets or slabs which have significant dimensions in both directions perpendicular to their path of travel during testing. For purposes of simplicity like parts have been given like reference numerals, and it will be seen that the system of FIGURE 3 incorporates the mechanisms of FIGURE 1 with the addition of a second nondestructive testing device 2a oriented to generate a voltage proportional to the width of the defect encountered. This proportional voltage, together with the proportional voltage generated by testing device 2 which measures defect depth, is fed into multiplier 6 which produces a first output voltage which is the product of defect depth and defect width. This output voltage is fed to a second multiplier 6a which also receives the proportional voltage generated by material speed transducer 4, the multiplier 6a generating an output voltage proportional to the product of the input signals, which in this instance represents defect volume in accordance with equation (III) above. The output voltage of multiplier 6a is fed to integrator 7 which shows the accumulated charge, the accumulated charge being indicated on voltmeter 8. As in the case of the embodiment of FIGURE 1, the total length of the material being tested is measured by footage indicator 9 which produces a proportional voltage readable on voltmeter 11. The operator may readily compute the quality number in accordance with equation (IV) above, the quality number being either a measure of strip defect to total length or to total volume, as desired.

Figure 4:
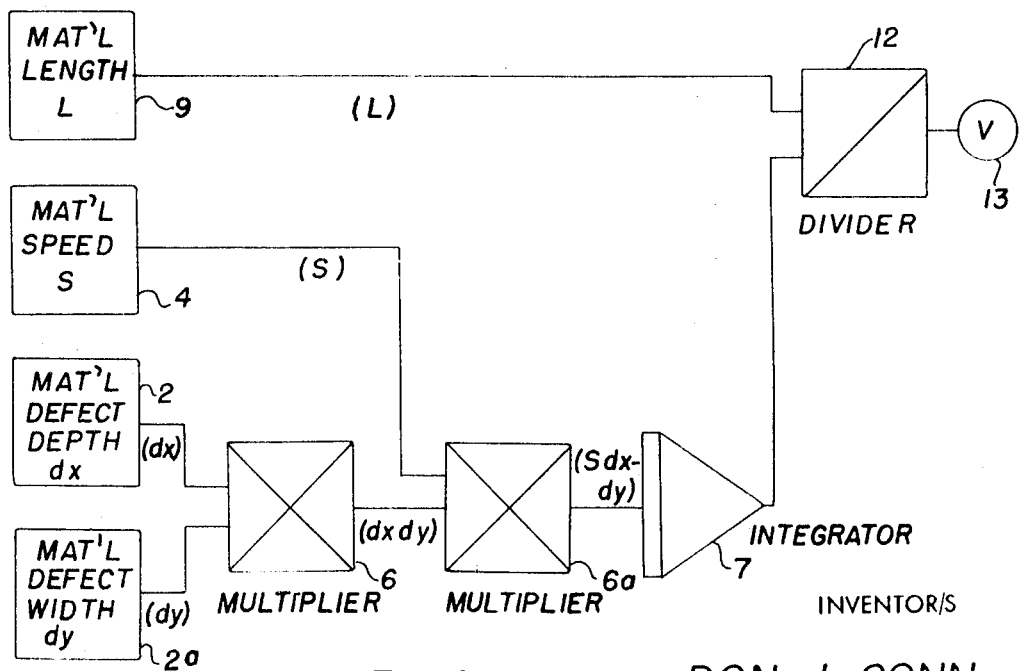
FIG. 4 is a schematic representation of a system for determining defect volume wherein the quantity number is automatically computed.

In the embodiment of FIGURE 4 wherein like components have again been given like reference numerals, provision is made for automatically computing the quality number, the outputs of integrator 7 and footage indicator 9 being fed to the divider 12 which will automatically compute the quality number. In this connection the divider 12 can be programmed to compute total strip volume by multiplying total strip length by known strip thickness and width, which are normally constant, thereby producing a quality number at voltmeter 13 which is a direct percentage reading of total defect volume to total strip volume.

As should now be apparent, the instant invention provides a highly accurate testing procedure and apparatus which is free from operator judgment and variations in measuring techniques and provides a quality number which is independent of material speed variations and hence a truly accurate indicator of strip quality. It is to be understood that modifications may be made in the invention without departing from its spirit and purposes. Various such modifications have already been indicated, and others will undoubtedly occur to the skilled worker in the art upon reading this specification. For example, where strip thickness and/or strip width might be variable, additional measuring devices may be included to generator proportional voltages indicative of such variations, which may be utilized to compute total strip volume. Should a situation arise where the signals generated by a plurality of the testing devices interfere with each other, the units may be displaced relative to each other with the provision of means to delay the signal from the leading sensing unit.

The embodiments of the invention in which an exclusive property or privilege is claimed are defined as follows:

1. In combination in apparatus for the continuous nondestructive testing of essentially homogenous materials,
means for generating a first voltage which is a function of the magnitude of material defects,
means for generating a second voltage which is a function of material speed,
means for multiplying said first and second voltages to produce an output voltage which is the product of said first and second voltages,
means for accumulating the said output voltage,
means for measuring the total length of the material being tested, and
readout means for indicating values for at least total strip length and accumulated output voltage.

2. The apparatus claimed in claim 1 wherein said means for measuring the total length of the material comprises means producing a voltage proportional to material length.

3. The apparatus claimed in claim 2 wherein said readout means comprises a first voltmeter for indicating the voltage output of said strip length measuring means, and a second voltmeter for indicating the accumulated output voltage of said accumulating means.

4. The apparatus claimed in claim 2 wherein said readout means includes divider means for dividing the output voltage accumulated by said accumulating means by the output voltage of said strip length measuring means.

5. The apparatus claimed in claim 1 wherein said accumulating means comprises an analog integrator.

6. The apparatus claimed in claim 1 wherein said accumulating means comprises a digital integrator.

7. The apparatus claimed in claim 1 wherein said multiplying means comprises a Hall-Effect multiplier.

8. The apparatus claimed in claim 1 wherein said multiplying means comprises an electronic multiplier.

9. The apparatus claimed in claim 1 wherein said means for generating said first voltage comprises an eddy current testing means.

10. The apparatus claimed in claim 1 wherein said means for generating said first voltage comprises a thermal testing means.

11. The apparatus claimed in claim 1 wherein said multiplying means comprises a servomultiplier.

12. The apparatus claimed in claim 1 wherein said means for generating said first voltage comprises an ultrasonic testing means.

13. The apparatus claimed in claim 1 wherein the means for generating said second voltage comprises a material speed transducer such as a tachometer generator.

14. The apparatus claimed in claim 1 wherein the means for generating a first voltage which is a function of the magnitude of material defects includes means for generating voltages proportional to both defect depth and defect width, and means for multiplying said proportional voltages to generate said first voltage.

15. The apparatus claimed in claim 14 wherein the means for measuring total material length comprises means producing a voltage proportional to total material length, and includes means for producing voltages proportional to material width and material thickness, and wherein said readout means includes means for multiplying the proportional voltages representing total material length, material width and material thickness to produce an output voltage representing total material volume, and means for dividing the output voltage accumulated by said accumulating means by the output voltage representing total material volume.

16. A procedure for the continuous nondestructive testing of essentially homogenous materials which comprises the steps of:
advancing said material in a path of travel,
generating a first voltage which is a function of the magnitude of defects detected in the strip,
generating a second voltage which is a function of material speed,
multiplying said first and second voltages to produce an output voltage which is the product of said first and second voltages,
accumulating said output voltage and establishing a numerical value for said accumulated output voltage, and
measuring the total length of the material being tested and establishing a numerical value for the total length of the said material.

17. The procedure claimed in claim 16 including the step of establishing a quality number for said material by dividing the numerical value of said accumulated voltage by the numerical value of the total length of said material.

18. The procedure claimed in claim 16 wherein the total length of the material is measured by generating a voltage which is proportional to material length.

19. The procedure claimed in claim 16 including the step of establishing a quality number for said material by dividing the said accumulated output voltage by the voltage which is proportional to total material length.

20. The procedure claimed in claim 16 including the step of ultrasonically vibrating the material being tested, and generating said first voltage in response to the ultrasonic vibration of the material being tested.

21. The procedure claimed in claim 16 including the step of inducing eddy currents in the material being tested, and generating said first voltage in response to eddy currents induced in the material being tested.

22. The procedure claimed in claim 16 including the step of causing heat to flow through the material being tested, and generating said first voltage in response to the rate of flow of heat through the material being tested.

23. The procedure claimed in claim 16 including the step of generating voltages proportional to both defect depth and defect width and multiplying said proportional voltages to produce said first voltage.

24. The procedure claimed in claim 23 including the step of establishing a numerical value for the total volume of the material, and establishing a quality number for said material by dividing the numerical value of said accumulated voltage by the numerical value of the total volume of the material.

25. The procedure claimed in claim 23 wherein the total length of the material is measured by generating a voltage which is proportional to material length, and including the steps of generating voltages proportional to material width and material thickness, multiplying the voltages so generated to produce an output voltage which is proportional to total material volume, and establishing a quality number for said material by dividing the said accumulated output voltage by the output voltage which is proportional to material volume.